United States Patent [19]

Leliaert et al.

[11] 4,255,169

[45] Mar. 10, 1981

[54] METHOD OF CONSERVATION IN PROCESSING INDUSTRIAL AIR

[75] Inventors: Raymond M. Leliaert, South Bend; Robert N. Lindner, Granger; James K. Davidson, Mishawaka, all of Ind.

[73] Assignee: Wheelabrator-Frye Inc., Hampton, N.H.

[21] Appl. No.: 51,210

[22] Filed: Jun. 22, 1979

[51] Int. Cl.[3] ...................... B01D 46/42; B24B 55/06; F24F 3/16; B27G 19/00

[52] U.S. Cl. .......................................... 55/97; 55/311; 55/314; 55/315; 55/340; 55/417; 55/DIG. 18; 55/DIG. 29; 98/115 R; 51/270; 51/273; 144/252 A

[58] Field of Search .................... 55/97, 311, 314, 315, 55/340, 417, DIG. 18, DIG. 29, 385 A; 98/115 R; 51/270, 273; 144/252 R, 252 A; 83/100

[56] References Cited

U.S. PATENT DOCUMENTS

| | | | |
|---|---|---|---|
| 1,619,295 | 3/1927 | Gardner | 55/315 |
| 3,395,972 | 8/1968 | Hardison | 55/DIG. 18 |
| 3,509,911 | 5/1970 | Carsey | 55/DIG. 18 |
| 3,864,106 | 2/1975 | Brandt | 55/97 |
| 3,872,627 | 3/1975 | Schuster | 51/273 |
| 3,934,373 | 1/1976 | Lenaert et al. | 51/270 |
| 4,050,368 | 9/1977 | Eakes | 55/385 A |
| 4,164,901 | 8/1979 | Everett | 55/385 A |

FOREIGN PATENT DOCUMENTS

| | | | |
|---|---|---|---|
| 133261 | 6/1949 | Australia | 55/338 |
| 99776 | 6/1961 | Netherlands | 98/115 R |
| 504644 | 4/1976 | U.S.S.R. | 144/252 R |

*Primary Examiner*—David L. Lacey

*Attorney, Agent, or Firm*—McDougall, Hersh & Scott

[57] ABSTRACT

A method is disclosed for recycling industrial air. Air contaminated by particulates is removed from the area of machinery, transported to dust collectors, and filtered. A small portion of the filtered air is discharged to the outside atmosphere while a substantial portion is recycled to the area of the machinery. Significant savings of energy are realized while less particulates are exhausted with the air into the atmosphere as contaminants.

3 Claims, 2 Drawing Figures

METHOD OF CONSERVATION IN PROCESSING INDUSTRIAL AIR

BACKGROUND OF THE INVENTION

The present invention relates to the processing of air contaminated by particulates entrained with the air during industrial operations.

Industries such as foundries and fabrication or welding plants use machinery which produces airborne particulates as a result of grinding, melting, forging, pouring, welding, shakeout, abrasive blast cleaning or other operations. Since the contaminated air may interfere with the operation of machinery and pose a definite health hazard to the workers, these machines are usually equipped with hoods or cabinets to confine the air which carries the particulates. The hoods and cabinets are connected to duct work and blowers which remove the air from the work area and ventilate it to the outside atmosphere. This, however, creates another health hazard since the particulates in the air discharged from such industrial operations may pollute the atmosphere. It is, therefore, common practice to treat the contaminated air for the removal of entrained particulates, as by means of a dust collector, electrical precipitator, water wash or the like. Such systems for treating exhaust air or gases are efficient from the standpoint of removal of the larger particulates but are less efficient in the removal of dusts and fine particulates. These finer particles pose a health hazard and the O.S.H.A. PEL (Permissible Exposure Levels) generally prohibit recycle of such treated air to the workers' general breathing zone. Hence, even the filtered or treated air must be discharged to the outside atmosphere.

Removing the air from the workers' breathing zone, filtering it, and discharging it to the outside atmosphere provides a safe work environment without significantly polluting the atmosphere. It does, however, represent considerable waste of energy in the form of heat invested in the air. This is because for every cubic foot of particulate-carrying air which is discharged to the outside atmosphere a corresponding amount of air must be drawn into the plant and heated to a level suitable for the working environment. In some circumstances, this can require raising the temperature of tens of thousands of cubic feet of air per minute by as much as 70° F. As a result, valuable amounts of energy are used to heat the air which is retained in the factory for a comparatively short time before being exhausted to the outside atmosphere.

It is, therefore, an object of this invention to provide a method of ventilation for machinery which will minimize the amount of particulates in the vicinity of the workers, as well as the amount exhausted into the atmosphere; which removes particulate laded air from the air surrounding dust producing machinery; which removes particulates from the air; which returns a substantial portion of the treated air to the vicinity of the processing equipment so that the amount of air brought into the factory and heated to room temperature can be markedly reduced, thereby to provide vast savings in the amount of energy used for heat; and in which the method for conserving heat energy may be practiced without extensive modification to the existing equipment.

It is the ultimate object of this invention to conserve natural resources used to heat factory air and to reduce the amount of contaminants exhausted into the atmosphere.

Other objects and advantages of the invention will be apparent from the remaining portions of the specification.

BRIEF SUMMARY OF THE INVENTION

The foregoing and other objects are achieved by practicing a method of removal of entrained particulates, as by filtration comprised of the following steps: Collecting the air contaminated by dust in the area of the dust producing machinery as by the use of cabinets or hoods; transporting the contaminated air by duct work from the cabinets or hoods to a dust collecting means; removing a substantial part of the particulates from the air by means of dust collectors or the like; venting a relatively small portion of the cleansed air to an area removed from the work area and general breathing zone; recycling a substantial portion of the cleansed air to the work area.

The invention will hereinafter be described with reference to the accompanying drawings, in which:

FIG. 1 is an elevation view showing a ventilation system which may be used in conjunction with a tumblast machine to practice the method herein disclosed; and FIG. 2 is an elevation view showing a ventilation system which may be used in conjunction with a monorail blasting machine which may be used to practice the method herein disclosed.

The parts of the system which are usually presently installed in industrial plants are shown schematically while parts of the ventilation system which must be added to the plants are illustrated in a normal fashion.

DETAILED DESCRIPTION OF THE INVENTION

The invention will be described with reference to the ventilation of machines used in the surface treatment of manufactured items. More specifically, the machines blast the surfaces of the items with steel shot, steel grit, or other abrasive materials. This process is well known in the art and causes particulate matter to become entrained in the ambient atmosphere which can create a health hazard to the workers, and interfere with the operation of other machinery. It must be appreciated that various other manufacturing processes also generate similar particulates and that the present invention is by no means limited to use in the surface blasting industry.

It is well known in the art to provide the blasting equipment with enclosing cabinets or adjacent hoods to allow the particulate filled atmosphere to be captured and drawn off so that the atmosphere of the work area is not polluted. Of course, if the dust laden air is vented directly to the ambient air outside the factory, the particulates will pollute the atmosphere. Thus, the common practice has been to filter the contaminated air by means of dust collectors using fabric filters, electrostatic precipitators, or scrubbers which removed virtually all of the large particulates.

Despite advances made in the apparatus to treat air, it is still not economically feasible to remove all the particulates from large volumes of air flow. Although a high percentage of the larger particles can be removed by dust collectors, a small percentage of the smaller particulates remain in the filtered air. The removal of the large particulates purifies the air sufficiently so that it will have no dangerous impact on the environment when vented outside the factory. However, since fine particulates remain in the effluent from the dust collectors, this air should not be returned to the areas where it might be inhaled by workers. In fact, the O.S.H.A. Permissible Exposure Levels generally prohibit the discharge of this air into the work area.

Heretofore, the only solution was to exhaust air carrying such fine particulates to the outside atmosphere.

A major drawback to the present method of ventilation is that not only are the small particulates vented to the outside environment, but large amounts of energy in the form of heated air carrying the particulates are also discharged. When the contaminated air is expelled through the chimney, or vent, an equal volume of air must be drawn into the factory to make up for the loss. In less temperate climates, the temperature of the air drawn in must be heated for raising the temperatures by as much as 70° F. This energy to heat the air is costly and increases the factory's use of our nation's energy supplies.

The present invention is addressed to a method of removing the particulates from the work area but discharges a fraction of the filtered air to the outside. Therefore, the use of make-up air and, more importantly, fuel to heat it, is significantly reduced.

Figure 1:
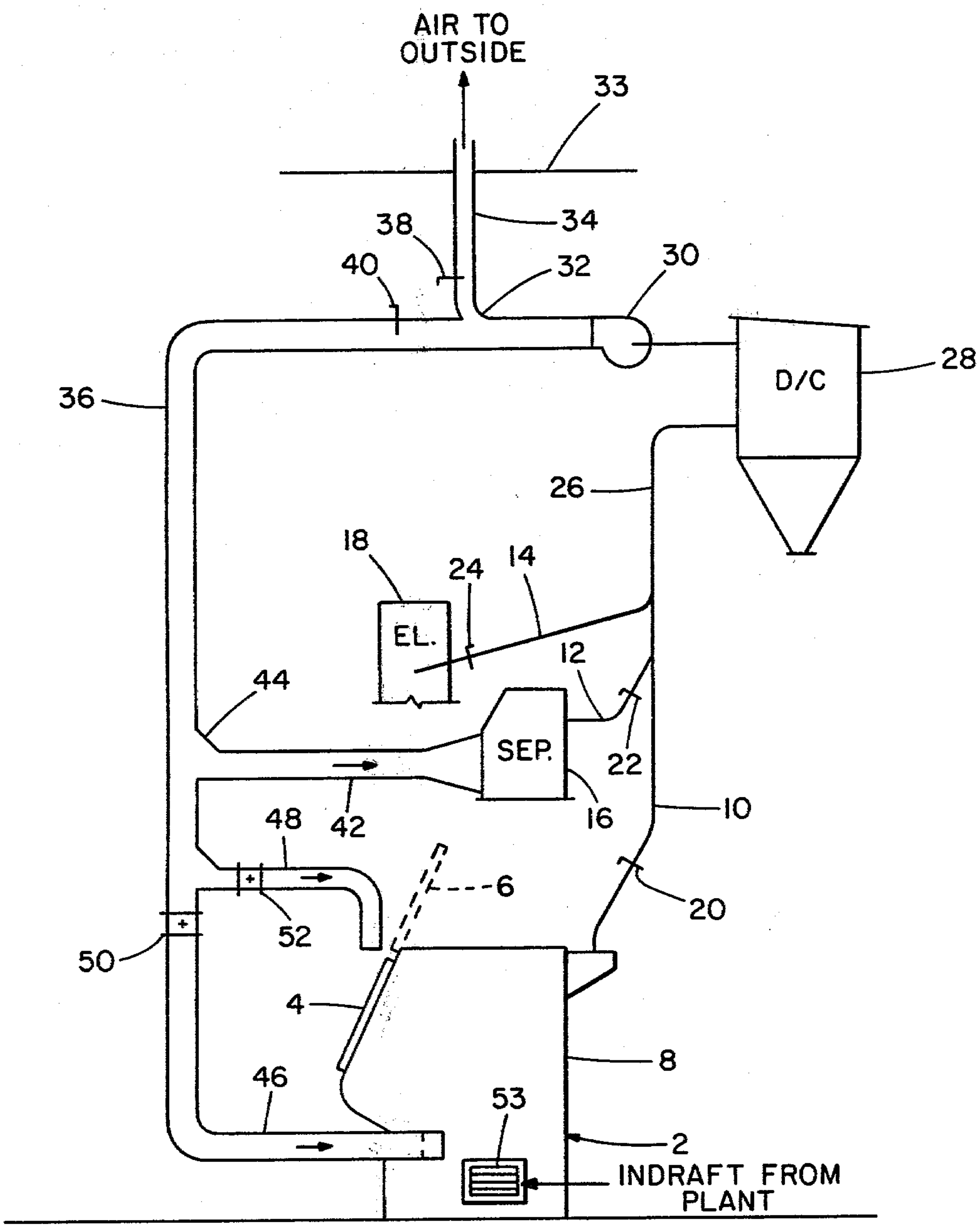

Referring to FIG. 1, an apparatus for practicing this method is illustrated. The tumblast 2 is a machine where articles may be processed by means of abrasive blast cleaning. Articles are placed into the blast cabinet via door 4 which is shown in an open position by a phantom illustration 6. During the normal operation of the blast the door is, of course, shut.

Duct 10 removes the contamined air from the cabinet 8 while ducts 12 and 14 remove the contaminated air through separator 16 and elevator 18 respectively. The separator and elevator are devices which are used to remove the contaminated particulates from the abrasives which are recycled to the blasting operation. The air flow in the individual ducts 10, 12 and 14 can be manually controlled by dampers 20, 22 and 24 respectively. The ducts lead into main vacuum header 26 which carries the air and particulates to dust collector 28 where the air is cleansed by means of fabric filters. The draft is supplied by fan exhaust 30.

The high pressure effluent side of fan 30 is ducted to junction 32 where only a small portion of the air is vented to the atmosphere through the building wall 33 via chimney 34 and the larger remainder of the air enters recirculation header 36. The proportion of air flow through chimney 34, and recirculation header 36 can be controlled by dampers 38 and 40 respectively. The make-up air is recirculated back to the separator 16 by means of duct 42 which is fed from the recirculation header 36 at junction 44. Thus, the air removed through duct 12 is made up at least in its major part by air from duct 42, thereby to militate against the necessity of drawing air in large amounts from the outside.

The make-up air of cabinet 8 is provided by a pair of ducts fed by the recirculation header 36. Duct 46 provides air directly to the interior of the cabinet during normal operation of the machine. Duct 48 provides make-up air to an area adjacent to doorway 4. Dampers 50 and 52 in ducts 46 and 48 are linked to the door control. When the door is closed, damper 52 is closed and damper 50 is opened so as to allow air flow through duct 46 while preventing air flow through duct 48. When the door is opened, damper 52 is open and damper 50 is closed to permit air flow through duct 48 but not 46.

The operation of dampers 50 and 52 are extremely important where articles are frequently moved into and out of cabinet 8. During normal operation when doorway 6 is closed, the air removed from the cabinet by duct 10 is made up by air from duct 46. When work is stopped and the door is opened, the air inside the cabinet may still be laden with particulates, hence the ventilation of air in the area of the open doorway by duct 48 helps to induce a draft which enters the doorway and prevents suspended particulates from escaping into the factory work area.

It will be noted that there is still a loss of some of the air to the outside environment and this is made up for by factory air drawn into the system. When ducted hoods are used to gather and confine the particulate laded air, the majority of the make-up air is provided by the recirculation system. The remaining part, represented by that exhausted to the outside atmosphere can be drawn into the hood from the ambient air adjacent the unit. However, when a cabinet 8 is used as in the present illustration, more air is being removed by duct 10 than is being returned by duct 46. In order to equalize the air flow into the cabinet and the air being removed, the cabinet is provided with register 53 which allows factory air to flow into the cabinet.

Some typical flow rates of the apparatus illustrated are helpful in understanding its operation and the proper designed parameters for the ducts, dust collectors and fans. Typically, 3,000 CFM would be removed from the tumblast cabinet, 1,000 CFM would be removed from the separator. 300 CFM would be removed from the elevator. Thus, the fan and dust collectors are designed for an air flow of 4,300 CFM. The dampers at junction 32 are optionally adjusted so that, say, 20% or 860 CFM of air is removed from the system and discharged to the outside atmosphere. The remaining 80% of the air or 3,440 CFM flow in the recirculation header. At junction 44, 1,000 CFM is bypassed to the separator and the remaining 2,440 CFM are ducted to the tumblast cabinet. Since 3,000 CFM are removed from the cabinet, and 2,440 CFM are recirculated to it, the air flow through register 53 should be about 560 CFM. Although the illustration does not show an air source for elevator 18, the make-up air can be provided by a register similar to 53.

Figure 2:
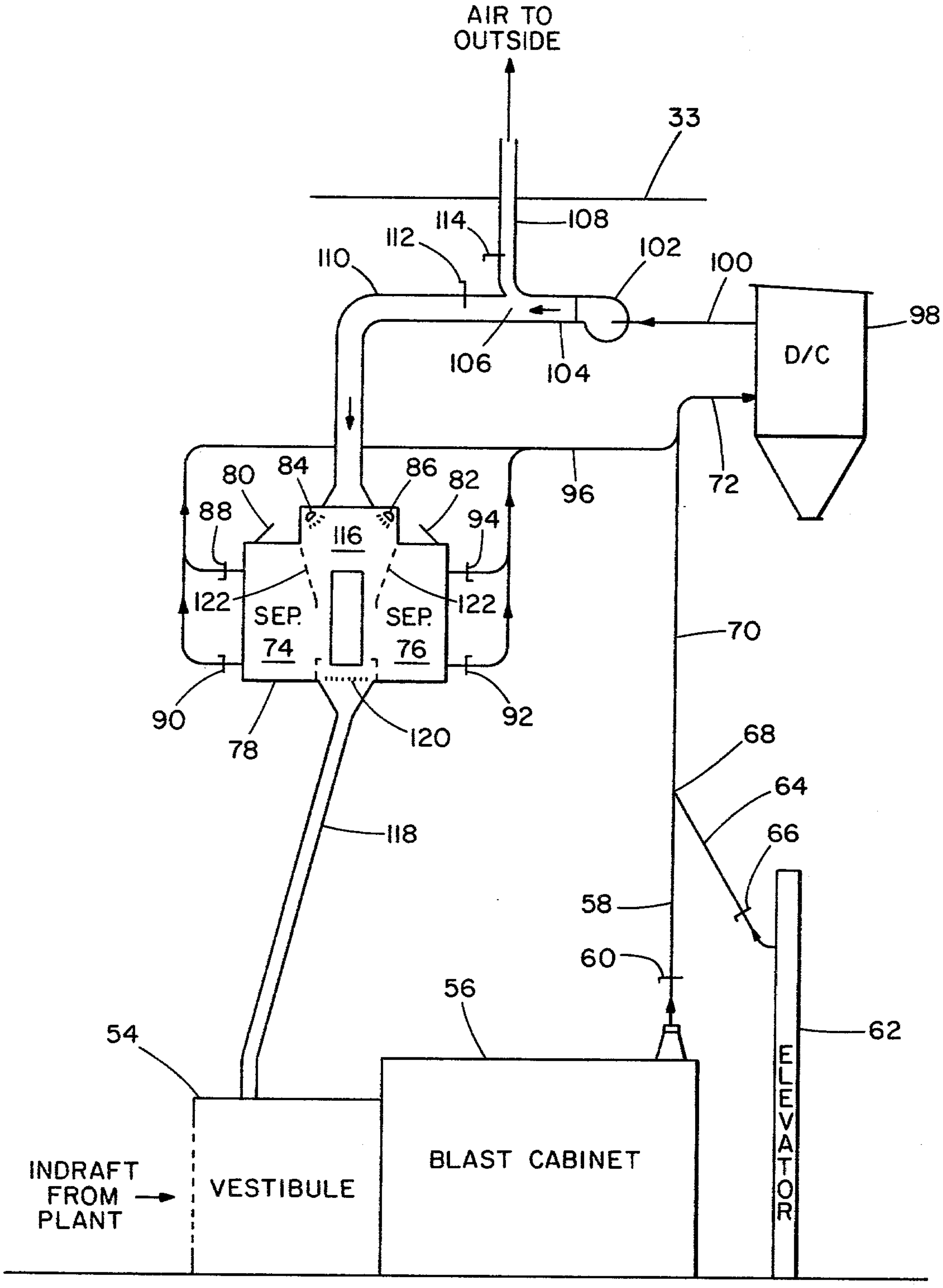

FIG. 2 shows a device for practicing the method of this invention for conserving energy in conjunctiion with a typical monorail or large blast machine. In such a device, the articles to be cleaned are carried by conveyor from vestibule 54 into the blast cabinet 56 and obviates the need for a door on the blast cabinet. The dust contaminated air is removed from the cabinet by duct 58, the air flow is controlled by damper 60. The air in elevator 62 is removed by duct 64, the air flow is controlled by damper 66. These two ducts join at junction 68 and are carried by duct 70 to the vacuum header 72.

The separators 74 and 76 are provided with a plenum housing 78 enclosing the space between the separators. The housing may be provided with man doors 80 and 82 as well as lights 84 and 86 to permit inspection of the separators. The contaminated air is vented from the plenum at dampers 88, 90, 92 and 94 which may be adjusted to provide the desired volume of air removal. The particulate ladened air is carried by duct 96 to the main vacuum header 72.

The dust laden air flows through the main vacuum header 72 to dust collector 98 where it is filtered. The filtered air is removed from the dust collector by duct 100 and fan 102. As before, the effluent side of the fan at duct 104 carried air still contaminated with a small amount of very fine particulates. At junction 106, a portion of the air is diverted to a chimney 108 and discharged to the air outside the factory. A major portion, typically 80%, of the filtered air, however, is recirculated through header 110, the ratio of the air recirculated to the air exhausted can be varied by adjustment of dampers 112 and 114.

The recirculation header returns the air to subsection 116 of the plenum 78. A high pressure area is thus created in subsection 116 and the subsection provides recirculated air to the secondary recirculation duct 118 through floor grating 120. The secondary recirculation duct provides air to the vestibule 54 of the blast cabinet.

$352,000 per year, while the cost of modifications to the ductwork and the machines would be a one-time cost of $35,000. Were that air not recirculated, some $1,021,000 would have to be spent on heating the make-up air over a three year period. Thus, a million dollars worth of heat may be saved in just three years by installing equipment at a cost of $35,000. This not only is a saving to the manufacturer, but also a saving of the country's oil and coal resources which would ordinarily have been spent on heating the make-up air.

Additional savings would be expected to be obtained over and above those shown in Table 1. This is because the machinery themselves generate a large amount of heat. Part of this heat is produced by the physical work of grinding, blasting or cutting and the other portion is provided by the motors which run the machinery. In the absence of recirculation, this heat would be lost to the outside air.

TABLE NO. I

| Blast Machine Ventilation in CFM. | Volume of air being returned to machine at 80%, i.e. air not requiring heating for makeup in CFM. | What the 80% would have cost, based on 50° F. rise, assuming average for year based on 16 hrs/day, for 125 days at $5.50/hr/1000 CFM or $11,000/1000 CFM* | Est. cost of modifications to ductwork & machine | Est. savings for 3 years |
|---|---|---|---|---|
| 10,000 | 8,000 | $88,000 | $10,000 | $254,000 |
| 20,000 | 16,000 | $176,000 | $20,000 | $508,000 |
| 30,000 | 24,000 | $264,000 | $28,000 | $764,000 |
| 40,000 | 32,000 | $352,000 | $35,000 | $1,021,000 |
| 50,000 | 40,000 | $440,000 | $40,000 | $1,280,000 |

*Based on Mishawaka prices as an average for country.

Recirculated air is provided to the separators by means of grill work 122.

Again, some typical flow rates are helpful in understanding the operation of the system. 16,000 CFM are withdrawn from the blast cabinet while 700 CFM and 8,000 CFM are removed from the elevator and separator plenum housing. As a result, the fan and dust collector would have an air flow of 24,700 CFM. At junction 106, 20% or 4,940 CFM of the airflow is vented to the outside while the remaining 80% or 19,760 CFM is recirculated to the plenum chamber. 11,800 CFM is a typical flow rate expected in secondary header 118. Since 16,000 CFM is removed from the blast cabinet and only 11,800 CFM are recirculated to the vestibule, an additional 4,200 CFM would be expected to flow into the vestibule from the plant.

FIGS. 1 and 2 show part of the system schematically while others are illustrated in a normal fashion. This is to highlight the fact that much of the apparatus necessary to practice this method is typically found in present installations. That apparatus is shown schematically, i.e., the enclosures and exhaust hoods, vacuum headers, dust collectors and fans. These are usually necessary to meet O.S.H.A. Permissible Exposure Levels. To practice the method herein disclosed, the only additional installation necessary is the junction, recirculation ducts and dampers. In some instances, a larger fan may be necessary because of the added distance the air must be displaced during recirculation.

The heat savings representative of the practice of the invention are shown on Table No. 1. By way of example, assume that the machines in a factory require ventilation with 40,000 CFM of air. By practicing the method of the invention, some 32,000 CFM are returned to the cabinet or hoods and not vented to the outside. This 32,000 CFM would normally have had to be replaced with air from the outside at a cost of The cost of the added ductwork is less than making modifications to existing machinery. Fuel is not only conserved but use can be made of a heating plant of smaller capacity since it need only heat a fraction of the air that otherwise would have been required to be heated in existing systems. Less power is required for the movement of lesser amounts of air.

Whereas great volumes of heated air is considerably removed from the building in existing systems, lesser amounts are wasted in accordance with the practice of this invention. Furthermore, the industrial processes, such as grinding, forging or blasting may create sizable amounts of heat energy of their own. This heat would be lost to the outside atmosphere were it not for recirculation of a major portion of the air in accordance with the practice of this invention.

It will be understood that changes may be made in the details of construction, arrangement and operation, without departing from the spirit of the invention, especially as defined in the following claims.

I claim:

1. A method of conserving energy invested in processed air contaminated with dust or dirt generated within a cabinet having a door and doorway for access to the interior of the cabinet comprising the steps of:

(a) exhausting the contaminated air from the cabinet to a dust collecting means;

(b) removing a substantial part of the contaminating dust or dirt from the contaminated air to provide a cleansed air by processing the contaminated air through dust collecting means;

(c) venting a relatively small portion of the cleansed air to the atmosphere;

(d) returning a substantial portion of the cleansed air to the cabinet when the door is closed;

(e) returning a substantial portion of the cleansed air to the doorway when the door is open; and (f) introducing an amount of air from the atmosphere adjacent the cabinet into the cabinet corresponding to the amount vented into the atmosphere.

2. The method of claim 1 wherein the steps take place in a continuous fashion.

3. A method of conserving energy invested in processed air contaminated with dust or dirt generated within a cabinet having a vestibule leading into the cabinet for access into the interior of the cabinet comprising the steps of (a) exhausting the contaminated air from the cabinet to a dust collecting means;

(b) removing a substantial part of the contaminated dust or dirt fron the contaminated air to provide a cleansed air by processing the contaminated air through the dust collecting means;

(c) venting a relatively small portion of the cleansed air to the atmosphere;

(d) returning a substantial portion of the cleansed air to the vestibule; and (e) introducing an amount of air from the atmosphere into the vestibule corresponding to the amount vented to the atmosphere.

* * * * *